United States Patent Office 3,407,190
Patented Oct. 22, 1968

3,407,190
METHOD FOR THE PRODUCTION OF 5'-RIBONUCLEOTIDE
Mikio Honjo and Kin-Ichi Imai, Takatsuki, Japan, assignors to Takeda Chemical Industries, Ltd., Osaka, Japan
No Drawing. Filed July 26, 1966, Ser. No. 567,844
Claims priority, application Japan, July 27, 1965, 40/45,731
13 Claims. (Cl. 260—211.5)

ABSTRACT OF THE DISCLOSURE

Without protecting the hydroxy groups at the 2'- and 3'-positions, 5'-ribonucleotides are prepared in good yields directly from the corresponding nucleosides in intimate admixtures with a nitrile having from 2 to 8 carbon atoms.

---

This invention is concerned with a method for the production of 5'-ribonucleotide, which comprises reacting the corresponding ribonucleoside with a specific phosphorylating agent in the presence of nitrile, followed by subjecting the resultant product to hydrolysis.

Ribonucleoside has three hydroxy groups at the 2'-, 3'- and 5'-positions, respectively, on its ribose moiety, and when ribonucleoside is directly subjected to phosphorylation, a mixture of ribonucleoside-2',5'-diphosphate and -3',5'-diphosphate is produced.

Therefore, in order to selectively produce 5'-ribonucleotide from the corresponding ribonucleoside, it has been necessary to protect the hydroxy groups at the 2'- and 3'-positions with certain suitable substituents prior to effecting phosphorylation at the 5'-position.

Thus, the hitherto-known methods for the production of 5'-ribonucleotide starting with the corresponding ribonucleoside consists of protecting the 2'- and 3'-hydroxy groups on the ribose moiety with acyl groups (e.g., acetyl, benzoyl radicals, etc.) or with the isopropylidene group, subsequently phosphorylating the free 5'-hydroxy group by an appropriate agent, and then removing the protecting groups.

However, the hitherto-known methods are not advantageously applicable to the preparation of 5'-ribonucleotide from the corresponding ribonucleoside on a commercial scale because they require many troublesome steps, especially the step of protecting the 2'- and 3'-OH groups and that of removing the protecting groups; moreover the yield of the product is low.

Although many attempts were made to overcome the foregoing disadvantages, none of them, so far as the present inventors are aware, was entirely successful, at least from the industrial viewpoint. The present inventors and other co-researchers had already studied the problem of providing a desirable method for the chemical preparation of 5'-ribonucleotide and had unexpectedly discovered that a selective phosphorylation of the 5'-hydroxyl group of ribonucleoside can easily be accomplished, without requiring protection of hydroxyl groups at the 2'- and 3'-positions prior to the phosphorylation, by allowing the ribonucleoside to react with phosphorylating agent in the presence of a phenol.

The present invention is a further development, according to which, with the use of a nitrile in place of the phenol, only the hydroxyl group at the 5'-position is selectively phosphorylated by reacting the ribonucleoside with a phosphorylating agent without protecting the hydroxyl groups at the 2'- and 3'-positions, the time required for completing the phosphorylating reaction being much shortened by the use of the nitrile in place of the phenol.

The present invention is accomplished on the basis of the new development, and comprises reacting ribonucleoside with phosphorylating agent in the presence of nitrile, followed by subjecting the resultant product to hydrolysis.

It is an object of the present invention to provide a novel and industrially feasible method for the production of 5'-ribonucleotide from the corresponding ribonucleoside.

It is also an object of the invention to prepare 5'-ribonucleotide from the corresponding ribonucleoside in a good yield by simple procedure and without the necessity of protecting the hydroxy groups at the 2'- and 3'-positions.

The present method for the production of 5'-ribonucleotide is a superior one from an industrial point of view, since it does not involve such troublesome procedures as protection of the 2'- and 3'-OH groups and removal of the protecting groups, and easily affords the desired 5'-ribonucleotide in a good yield, and the time required for completion of the phosphorylating reaction is shorter than in the case of using phenol.

As stated above, the present invention comprises reacting ribonucleoside with a phosphorylating agent in the presence of the nitrile compounds.

The ribonucleotide in the present invention is exemplified by those containing a purine base (e.g., adenine, hypoxanthine, guanine, etc.), those containing a pyrimidine base (e.g., cytosine, uracil, thymine, etc. and those containing a pyridine base (e.g., nicotinamide, etc.) regardless of whether such ribonucleotide is naturally occurring or synthetic.

The nitrile compounds used in the present invention are those having two to eight carbon atoms and are exemplified by aliphatic mononitriles such as acrylonitrile, acetonitrile, butyronitrile; aliphatic dinitriles such as malononitrile and succinonitrile; and aromatic nitriles such as benzonitrile, benzylnitrile, toluinitrile, etc.

These nitrile compounds can successfully be employed singly or in various combinations.

Among the nitrile compounds, acrylonitrile, benzylnitrile, acetonitrile, malononitrile and benzonitrile give superior results, best results being given especially by acetonitrile, malononitrile and benzonitrile.

The phosphorylating agents in the present method comprise, for example, phosphorus trichloride, phosphorus oxychloride, phosphorus pentachloride, pyrophosphoryl tetrachloride, partially hydrolyzed phosphorus oxychloride; partially hydrolyzed phosphorus pentachloride or partially hydrolyzed phosphorus trichloride which are prepared by mixing water and the phosphorus compound; or partially alcoholyzed phosphorus oxychloride, partially alcoholyzed phosphorus pentachloride or partially alcoholyzed phosphorus trichloride which are prepared by mixing a lower alcohol having 1 to 4 carbon atoms (e.g., methyl alcohol, ethyl alcohol, propyl alcohol, isopropyl alcohol, butyl alcohol, tertiary buty alcohol) with the phosphorus compound.

Among these phosphorylating agents, pyrophosphoryl tetrachloride, phosphorus oxychloride, partially hydrolyzed or partially alcoholyzed phosphorus oxychloride give best results. These agents can be successfully employed singly or in combination.

The present method is carried out by adding the phosphorylating agent to the ribonucleoside dissolved or suspended in nitrile compound(s) to allow phosphorylation to take place, and then hydrolyzing the resultant product.

The above mentioned ribonucleoside, nitrile compounds or phosphorylating agents need not be in a pure state.

The amount of nitrile compounds and phosphorylating agents used vary with the kind of ribonucleoside, nitrile compound and phosphorylating agents.

Generally, the amount of phosphorylating agent is from about 1 to about 30 moles, optimally about 2 to about 5 moles, relative to the ribonucleoside, i.e., per mole of the latter.

The nitrile compounds are employed in an amount of not less than about 10 moles per mole of the ribonucleoside, and generally are employed in an amount ranging from about 10 to about 300, optimally from about 15 to about 50 moles, per mole of the ribonucleoside.

The reaction proceeds easily at not higher than room temperature (15° to 30° C.), but if desired can be carried out with heating or cooling.

In case of using liquid nitrile compounds, no solvent is required, since the nitrile acts as a solvent. On the other hand, in case of using a solid nitrile compound, a suitable solvent such as benzene, xylene, dioxane or acetic ester is used together with the nitrile.

Especially, in case of using a solid nitrile compound together with benzene as the solvent, the amount of nitrile compound can be saved.

In this way, only the 5'–OH group of the ribonucleoside is selectively phosphorylated. Thus-obtained product is then subjected to hydrolysis to give 5'-ribonucleotide.

The hydrolysis is carried out by per se known procedure, for example, by pouring the reaction mixture into water, preferably cooled water, or by adjusting the pH value of the reaction mixture obtained in the first step to the weakly acid area, desirably to about pH 1 to about pH 2 by adding an alkaline material (e.g., sodium hydroxide, potassium hydroxide, sodium carbonate, potassium carbonate, etc.). Thus, the desired 5'-ribonucleotide is produced.

As detailed above, by the present invention, 5'-ribonucleotide can be easily obtained in a short period of time by a simple process and under very moderate conditions as compared with those of prior methods.

Moreover, the 5'-ribonucleotide is obtained in high purity and good yield.

For the purpose of giving those skilled in the art a better understanding of the invention, the following examples of presently preferred embodiments are given. In these examples, the parts are by weight unless otherwise indicated. The relation between parts by weight and parts by volume is the same as that between grams and milliliters. Percentages are by weight.

EXAMPLE 1

To 1.08 parts of inosine suspended in 60 parts by volume of acetonitrile was added 2 parts by volume of pyrophosphoryl tetrachloride at 0 to 5° C. The mixture was left standing at the same temperature for 0.5 hours.

The reaction mixture was poured into 400 parts by volume of ice water and the whole mixture was adjusted to pH 2 with an N-aqueous solution of sodium hydroxide. Analysis of the so-adjusted solution by means of paper electrophoresis (borate buffer, pH 9.2) showed that inosine-5'-monophosphate was produced in a yield of 93%.

The solution was then adsorbed on a column of active charcoal. The column was washed with water and eluted with an 0.7% aqueous solution of sodium hydroxide. The eluate was adjusted to pH 8.6 and concentrated to give 1.35 parts of crystalline disodium salt of inosine-5'-monophosphate (calculated as anhydride). Yield 86%.

EXAMPLE 2

To a solution of 1.2 parts of uridine in 350 parts by volume of acetonitrile, were added 10 parts by volume of pyrophosphoryl tetrachloride at 0 to 5° C. The mixture was left standing at the same temperature for 0.5 hour.

The reaction mixture was concentrated to 100 parts by volume under reduced pressure.

The reaction mixture was treated as in Example 1 to give 1.56 parts of crystalline uridine-5'-monophosphate (calculated as anhydride). Yield 85%.

EXAMPLE 3

To a solution of 1.35 parts of inosine in 150 parts by volume of benzonitrile, was added 5 parts by volume of pyrophosphoryl tetrachloride at 0 to 5° C. The mixture was left standing at the same temperature for 0.5 hour.

The reaction mixture was poured into 400 parts by volume of ice water and the whole mixture was shaken with ether to transfer the benzonitrile into the ether layer. The ether layer was washed with water. The aqueous layer combined with the washing was adjusted to pH 2 with an N-aqueous solution of sodium hydroxide.

Analysis of the so-adjusted solution by means of paper electrophoresis (borate buffer, pH 9.2) showed that inosine-5'-monophosphate was produced in a yield of 92%.

EXAMPLE 4

To 1.35 parts of inosine dissolved in a mixture consisting of 75 parts of malononitrile and 75 parts by volume of ethyl acetate was added 5 parts by volume of pyrophosphoryl tetrachloride at 0 to 5° C. The mixture was left standing at the same temperature for 20 minutes.

The reaction mixture was poured into 400 parts by volume of ice water and the whole mixture was adjusted to pH 2 with an N-aqueous solution of sodium hydroxide. [Analysis of the solution by means of paper electrophoresis (citrate buffer, pH 5.8) showed that inosine-5'-monophosphate was produced in a yield of 88%]. The solution was treated in the same manner as in Example 1 to give 1.57 parts of crystals of disodium salt of inosine-5'-monophosphate (calculated as anhydride). Yield 80%.

EXAMPLE 5

To 0.267 part of adenosine suspended in 10 parts by volume of acetonitrile was added 0.5 part by volume of pyrophosphoryl tetrachloride at 0 to 5° C. The mixture was left standing at the same temperature for 0.5 hour.

The reaction mixture was treated as in Example 1 to give 0.314 part of crystals of disodium salt of adenosine-5'-monophosphate (calculated as anhydride). Yield 80%.

EXAMPLE 6

To 1.2 parts of cytidine suspended in 50 parts by volume of acetonitrile was added 2.5 parts by volume of pyrophosphoryl tetrachloride at 0 to 5° C. The mixture was left standing at the same temperature for 0.5 hour.

The reaction mixture was treated as in Example 1 to give 1.53 parts of crystals of disodium salt of cytidine-5'-monophosphate (calculated as anhydride). Yield 83%.

EXAMPLE 7

To 0.53 part of inosine suspended in 7.5 parts by volume of acetonitrile was added hydrolyzed phosphorus oxychloride prepared by mixing 4.5 parts by volume of phosphorus oxychloride and 0.01 part by volume of water at 0 to 5° C.

After the mixture was left standing at the same temperature for 2 hours to allow a reaction to take place, it was subsequently treated in the same way as in Example 1.

Analysis of the product by means of paper electrophoresis (borate buffer, pH 9.2) showed that inosine-5'-monophosphate was selectively produced.

EXAMPLE 8

To 1.97 parts of guanosine suspended in 36 parts by volume of acetonitrile, was added 5.4 parts of pyrophosphoryl tetrachloride at 0 to 5° C. The mixture was stirred at the same temperature for 0.5 hour.

The reaction mixture was treated as in Example 1 to give 2.0 parts of crystals of disodium salt of guanosine-5'-monophosphate (calculated as anhydride). Yield 70%.

Having thus disclosed the invention, what is claimed is:

1. In a method for producing 5'-ribonucleotide from the corresponding ribonucleoside, which includes a phosphorylation step with a phosphorylating agent, the improvement wherein the hydroxy-unprotected ribonucleoside is in intimate admixture with a nitrile of from 2 to 8 carbon atoms during the phosphorylation step, whereby the 5'-OH group of said ribonucleoside is selectively phosphorylated.

2. The method as claimed in claim 1, wherein the ribonucleoside is inosine.

3. The method as claimed in claim 1, wherein the ribonucleoside is guanosine.

4. The method as claimed in claim 1, wherein the ribonucleoside is adenosine.

5. The method as claimed in claim 1, wherein the ribonucleoside is cytidine.

6. The method as claimed in claim 1, wherein the ribonucleoside is uridine.

7. The method as claimed in claim 1, wherein the nitrile is acetonitrile.

8. The method as claimed in claim 1, wherein the nitrile is benzonitrile.

9. The method as claimed in claim 1, wherein the nitrile is malononitrile.

10. The method as claimed in claim 1, wherein the phosphorylating agent is pyrophosphoryl tetrachloride.

11. The method as claimed in claim 1, wherein the phosphorylating agent is phosphorus oxychloride.

12. The method as claimed in claim 1, wherein the phosphorylating agent is partially hydrolyzed phosphorus oxychloride.

13. The method as claimed in claim 1, wherein the molar ratio of phosphorylating agent to ribonucleoside is about 1 to about 30 and the molar ratio of nitrile compound to ribonucleoside is about 10 to about 300.

References Cited

UNITED STATES PATENTS

| | | | |
|---|---|---|---|
| 2,970,139 | 1/1961 | Duschinsky et al. | 260—211.5 |
| 3,201,388 | 8/1965 | Tsuchna et al. | 260—211.5 |
| 3,201,389 | 8/1965 | Fujimoto et al. | 260—211.5 |
| 3,282,920 | 11/1966 | Ouchi et al. | 260—211.5 |
| 3,290,285 | 12/1966 | Senoo et al. | 260—211.5 |

LEWIS GOTTS, *Primary Examiner.*

J. R. BROWN, *Assistant Examiner.*